United States Patent
Stolte et al.

(10) Patent No.: US 8,192,882 B2
(45) Date of Patent: Jun. 5, 2012

(54) FUEL CELL AND AIRCRAFT HYDRAULIC SYSTEM HAVING A COMMON COOLING CIRCUIT

(75) Inventors: Ralf Henning Stolte, Hamburg (DE); Volker Baumbach, Bremen (DE); Harald Gründel, Hamburg (DE)

(73) Assignee: Airbus Operations GmbH (DE)

( * ) Notice: Subject to any disclaimer, the term of this patent is extended or adjusted under 35 U.S.C. 154(b) by 698 days.

(21) Appl. No.: 12/223,705

(22) PCT Filed: Feb. 8, 2007

(86) PCT No.: PCT/EP2007/001081
§ 371 (c)(1), (2), (4) Date: Nov. 17, 2008

(87) PCT Pub. No.: WO2007/093319
PCT Pub. Date: Aug. 23, 2007

(65) Prior Publication Data
US 2009/0117430 A1 May 7, 2009

Related U.S. Application Data

(60) Provisional application No. 60/773,789, filed on Feb. 15, 2006.

(30) Foreign Application Priority Data

Feb. 15, 2006 (DE) .......... 10 2006 007 026

(51) Int. Cl.
*H01M 8/04* (2006.01)
(52) U.S. Cl. ......... 429/434
(58) Field of Classification Search ........ 429/434–439
See application file for complete search history.

(56) References Cited

U.S. PATENT DOCUMENTS

| | | | |
|---|---|---|---|
| 3,539,397 A | 11/1970 | Keating, Jr. et al. | |
| 4,275,603 A * | 6/1981 | Kalocsay | 73/861.68 |
| 5,031,690 A * | 7/1991 | Anderson et al. | 165/43 |
| 5,655,732 A * | 8/1997 | Frank | 244/1 R |
| 6,296,957 B1 | 10/2001 | Graage | |
| 6,383,672 B1 | 5/2002 | Fujita | |
| 6,569,550 B2 | 5/2003 | Khelifa | |
| 2003/0029177 A1 | 2/2003 | Clarke | |
| 2003/0035988 A1 | 2/2003 | Graage | |
| 2006/0060712 A1 | 3/2006 | Hoffjann et al. | |
| 2008/0102327 A1 | 5/2008 | Docter et al. | |

FOREIGN PATENT DOCUMENTS

| | | |
|---|---|---|
| DE | 10139608 A1 | 2/2003 |
| DE | 10201930 A1 | 8/2003 |
| DE | 10213134 A1 | 10/2003 |
| DE | 199 31 062 B4 | 2/2004 |
| DE | 100 18 139 B4 | 7/2006 |
| EP | 0 957 026 A3 | 4/2001 |
| EP | 1 283 166 A2 | 2/2003 |
| EP | 1 621 459 A1 | 2/2006 |
| RU | 2180978 C2 | 3/2002 |
| RU | 2224690 C2 | 2/2004 |
| RU | 2262778 C2 | 10/2005 |

* cited by examiner

*Primary Examiner* — Chandrika Prasad
(74) *Attorney, Agent, or Firm* — Lerner, David, Littenberg, Krumholz & Mentlik, LLP

(57) ABSTRACT

A system utilizing synergetic potentials at different systems such as of a fuel cell system and of an aircraft hydraulic system, through coupling them via a common cooling circuit system.

17 Claims, 1 Drawing Sheet

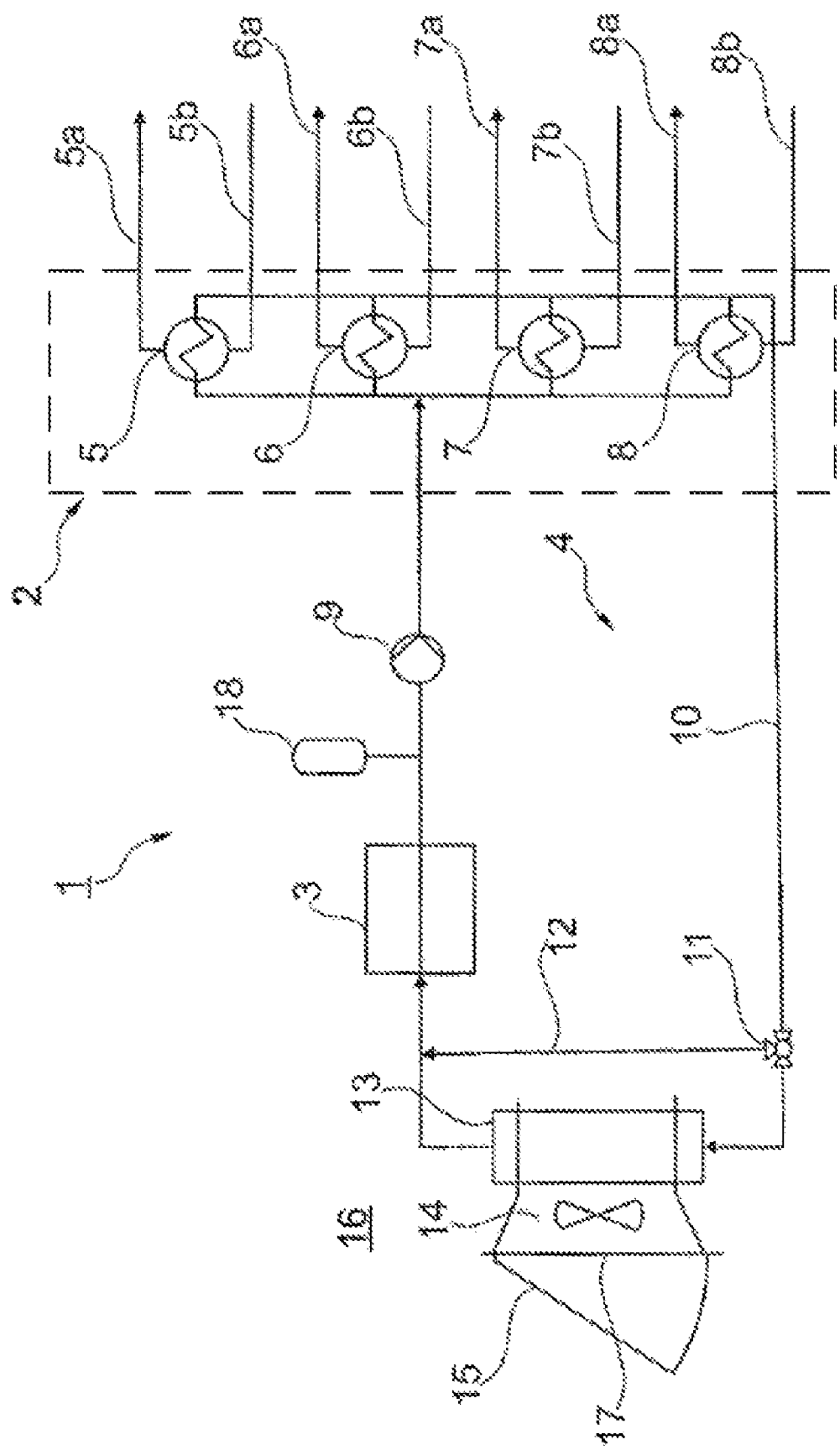

FUEL CELL AND AIRCRAFT HYDRAULIC SYSTEM HAVING A COMMON COOLING CIRCUIT

REFERENCE TO RELATED APPLICATIONS

This application claims the benefit of the filing date of German Patent Application No. 10 2006 007 026.7 filed Feb. 15, 2006 and of U.S. Provisional Patent Application No. 60/773,789 filed Feb. 15, 2006, the disclosure of which applications is hereby incorporated herein by reference.

FIELD OF THE INVENTION

The invention regards a system combining a heat generating system with a fuel cell system, in particular combining an aircraft hydraulic system with a fuel cell system.

BACKGROUND ART

In current aircraft technology there is the hydraulic system for operating inter alia the flight control system. This hydraulic system is divided into three different circuits (green circuit, yellow circuit, blue circuit). Under high loads in these circuits the maximum allowable temperature of the hydraulic fluid (e.g. Skydrol) of 90° C. can be reached, which causes high stress in the individual components (pumps, conduits, and seals). This reduces the reliability of these components.

A fuel cell is an electrochemical reactor, which produces electric and thermal energy from the reactive gases hydrogen and oxygen. The electric energy is conducted from the cell e.g. as direct current and conditioned accordingly for further use. The thermal energy, which is produced, has to be removed through a cooling circuit, so that the fuel cell does not overheat during operation, and does not get damaged.

SUMMARY OF THE INVENTION

It is an object of the invention to make use of the synergetic potentials of the two different above mentioned systems.

A solution for the objective can be derived from a system with a fuel cell system and a heat generating system, which are coupled to each other through a common cooling circuit system. Advantageous embodiments of the invention are also provided herein.

The system according to the invention includes a fuel cell system and a heat generating system, both connected through a common cooling circuit system.

The heat generating system has at least one heat exchanger, which can effectuate heat transfer between the heat generating system and the cooling circuit system.

A coolant may circulate in the cooling circuit system, absorbing heat from the heat generating system and keeping the fuel cell at a predetermined operating temperature, which improves and accelerates the starting properties of the fuel cell.

The cooling circuit system may include a pump, which can circulate the coolant in the cooling circuit in a pulsating, or in a continuous manner.

According to a further embodiment of the invention the cooling circuit system includes a reservoir, which may compensate for volume differentials of the coolant due to different coolant temperatures, and may buffer leakages in the cooling circuit system.

According to a further embodiment of the invention the cooling circuit system includes a cooler, which cools the coolant down to a predetermined temperature, before it is delivered to the fuel cell system.

According to another embodiment of the invention the cooler is a liquid-/air cooler with a fan.

According to another embodiment of the invention the heat of the coolant is transferred to the ambient via the cooler and via an out flow valve. The heat is thereby transferred to the ambient through an airflow created by a pressure differential. The airflow thereby cools the cooler.

According to another embodiment of the system, the heat generating system includes a hydraulic system and/or a power system.

According to a further embodiment of the invention the cooling circuit system is at least part of a cooling circuit system of the fuel cell.

According to another embodiment of the invention the hydraulic system and the fuel cell system have different operating windows. When the system according to the invention is used e.g. in an aircraft, the hydraulic system may be active during normal flight operation and may be being cooled, while the fuel cell system may be held at operating temperature, which may shorten its starting process. In an emergency situation the fuel cell system may be active and being cooled, while the hydraulic system may not be cooled or may only be partially cooled. Alternatively the hydraulic system and the fuel cell system may also have identical or overlapping operating windows.

Subsequently an embodiment of the invention is described with reference to FIG. 1.

FIG. 1 shows a system 1 according to a preferred embodiment of the invention.

The system 1 includes a hydraulic system 2 and a fuel cell system 3. The hydraulic system 2 and the fuel cell system 3 are coupled via a cooling circuit system 4.

The hydraulic system 2 according to the preferred embodiment includes a heat exchanger 5, connected to a blue hydraulic circuit of an aircraft (not shown) via an advance flow 5a and a reverse flow 5b.

As shown in FIG. 1 the hydraulic system 2 furthermore includes a heat exchanger 6, connected to an advance flow 6a and a reverse flow 6b of a green hydraulic circuit of an aircraft (not shown).

The hydraulic system 2 further includes a heat exchanger 7, connected to an advance flow 7a and a reverse flow 7b of a yellow hydraulic circuit of an aircraft (not shown).

According to the preferred embodiment the hydraulic system 2 furthermore includes a heat exchanger 8, connected to an advance flow 8a and a reverse flow 8b of an electronics- and power system cooling system of an aircraft (not shown).

The heat exchangers 5, 6, 7 and 8 are spatially separated, so that in case of a rotor burst or a tire burst not all three systems can be damaged and thereby fail.

A pump 9 circulates a coolant permanently or in a pulsating manner in the cooling circuit 4, wherein the coolant flows through the particular heat exchangers 5, 6, 7 and 8.

The heat exchangers 5, 6, 7 and 8 are located downstream of the pump 9 according to the preferred embodiment of the invention. The cooling circuit system includes a reservoir 18, which may compensate for volume differentials of the coolant due to different coolant temperatures, and may buffer leakages in the cooling circuit system.

As shown by the arrows in FIG. 1, the coolant flows out of the cooling circuit system 4 into the heat exchangers 5, 6, 7 and 8, and back into the cooling circuit 4 via a conduit 10 to a three way valve 11.

As soon as the aircraft is in motion, heat is being generated in the hydraulic system 2, which is being transferred to the coolant via the heat exchangers 5, 6, 7 and 8. The heated coolant is transferred to the three way valve 11 via the conduit 10. Through proper control of the three way valve 11 the heated coolant can either be directly conducted to the fuel cell system 3 via a bypass conduit 12, or via a liquid-/air cooler 13, disposed in parallel to the bypass conduit 12. The cooled coolant exiting the cooler 13 can then be mixed with the warm coolant supplied by the bypass conduit 12, in order to deliver coolant with a predetermined temperature to the fuel cell system 3.

The heat generated by the three hydraulic circuits and by the electronics- and power system cooling system is transferred according to the preferred embodiment via the liquid-/air cooler 13, which includes a fan 14, according to the preferred embodiment, and via an out flow valve 15 to the ambient 16. The air flow passing though the out flow valve 15, previously passes the liquid-/air cooler 13, and thereby takes advantage of a pressure differential between a cabin of an aircraft (not shown) and the ambient 16. Due to this synergetic effect the fan 14, which enforces an airflow, is only required in case of an emergency.

As shown in FIG. 1, according to a preferred embodiment, an aircraft outer skin 17 is disposed between the out flow valve 15 and the liquid-/air cooler 13.

Though the invention has been previously described with reference to a preferred embodiment, it is appreciated, that variations and modifications can be made without departing beyond the scope of the invention. For example, fewer or more hydraulic circuits may be included in the hydraulic system. Furthermore several hydraulic systems and fuel cells may be connected in the above mentioned manner, in order to take advantage of the synergetic effects of both systems.

Instead of the hydraulic system also another heat generating system can be used, which is coupled to the fuel cell system in the above described manner.

The invention has been described in the above with reference to an aircraft. The principle according to the invention can also be used for other areas where hydraulic systems and fuel cell systems are being used.

REFERENCE NUMERALS

1 System
2 Heat generating system, hydraulic system
3 Fuel cell system
4 Cooling circuit system
5 Heat exchanger
5a Advance flow, blue hydraulic circuit
5b Return flow, blue hydraulic circuit
6 Heat exchanger
6a Advance flow, green hydraulic circuit
6b Return flow, green hydraulic circuit
7 Heat exchanger
7a Advance flow yellow hydraulic circuit
7b Return flow, yellow hydraulic circuit
8 heat exchanger
8a Advance flow electronics- and power system cooling system
8b Return flow electronics- and power system cooling system
9 Pump
10 Conduit
11 Three way valve
12 Bypass conduit
13 Cooler
14 Fan
15 Out flow valve
16 Ambient
17 Aircraft outer skin
18 Reservoir

The invention claimed is:

1. A system comprising:
a fuel cell system, and
a heat generating system,
wherein the heat generating system is at least part of an aircraft hydraulic system including a hydraulic fluid,
wherein the fuel cell system and the hydraulic system are coupled to each other through a common cooling circuit system,
wherein heat is generated in the hydraulic fluid when the hydraulic system is operated,
wherein the cooling circuit system further comprises a coolant that circulates in the common cooling circuit system for exchanging heat with at least one of the hydraulic fluid and the fuel cell system.

2. The system according to claim 1, wherein the heat generating system comprises at least one exchanger effectuating a heat transfer between the heat generating system and the cooling circuit system.

3. The system according to claim 1, wherein the coolant maintains the fuel cell system at a predetermined operating temperature.

4. The system according to claim 3, wherein the cooling circuit system further includes a pump for circulating the coolant in the cooling circuit system in at least one of a pulsating or in a continuous manner.

5. The system according to claim 3, wherein the cooling circuit system further includes a reservoir for compensating for volumetric difference due to varied coolant temperatures and buffering leakages in the cooling circuit system.

6. The system according to claim 3, wherein the cooling circuit system further includes a cooler for cooling the coolant to a predetermined temperature before it is delivered to the fuel cell system.

7. The system according to claim 6, wherein the cooler comprises a liquid-/air cooler with a fan.

8. The system according to claim 6, wherein heat of the coolant is transferred to the ambient via the cooler and an out flow valve.

9. The system according to claim 8, wherein the heat is transferred to the ambient by an airflow created through a pressure differential.

10. The system according to claim 9, wherein the airflow cools the cooler.

11. The system according to claim 1, wherein the heat generating system further includes an electronics and power system cooling circuit.

12. The system according to claim 1, wherein the cooling circuit system operates as a heat source, raising the temperature of the hydraulic fluid of the hydraulic system to a higher thermal level.

13. The system according to claim 1, wherein the cooling circuit system is at least part of a cooling circuit of the fuel cell system.

14. The system according to claim 1, wherein the hydraulic system and the fuel cell system have different operating windows.

15. The system according to claim 1, wherein the hydraulic system and the fuel cell system have overlapping operating windows.

16. The system according to claim 1, wherein the hydraulic system and the fuel cell system have identical operating windows.

17. The system according to claim 1, wherein the coolant exchanges heat with both the hydraulic fluid and the fuel cell system.

* * * * *